(12) United States Patent
Kim

(10) Patent No.: US 7,973,754 B2
(45) Date of Patent: Jul. 5, 2011

(54) DISPLAY SUBSTRATE AND DISPLAY PANEL HAVING THE SAME

(75) Inventor: Dong-Gyu Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 1062 days.

(21) Appl. No.: 11/736,256

(22) Filed: Apr. 17, 2007

(65) Prior Publication Data

US 2008/0002123 A1    Jan. 3, 2008

(30) Foreign Application Priority Data

Jun. 30, 2006    (KR) .................. 10-2006-0060450

(51) Int. Cl.
*G09G 3/36* (2006.01)
*G02F 1/1343* (2006.01)

(52) U.S. Cl. .............. 345/96; 345/98; 345/100; 345/89; 345/92; 345/94; 349/38; 349/39; 349/139; 349/142; 349/144

(58) Field of Classification Search ............ 345/87–100, 345/208; 349/110, 187, 37–44, 138–147; 257/59

See application file for complete search history.

(56) References Cited

U.S. PATENT DOCUMENTS

| | | | | |
|---|---|---|---|---|
| 5,459,596 A * | 10/1995 | Ueda et al. | ............. | 349/39 |
| 5,600,461 A * | 2/1997 | Ueda et al. | ............. | 349/38 |
| 5,744,820 A * | 4/1998 | Matsushima et al. | ........... | 257/59 |
| 5,786,876 A * | 7/1998 | Ota et al. | ............. | 349/42 |
| 5,847,780 A * | 12/1998 | Kim et al. | ............. | 349/39 |
| 6,437,766 B1 * | 8/2002 | Matsushima et al. | ........... | 345/98 |
| 6,704,085 B2 * | 3/2004 | Nishimura et al. | ........... | 349/141 |
| 6,762,805 B2 * | 7/2004 | Ishino | ............. | 349/46 |
| 6,801,288 B1 * | 10/2004 | Ashizawa et al. | ............. | 349/149 |
| 2001/0005252 A1 * | 6/2001 | Lee et al. | ............. | 349/141 |
| 2002/0163493 A1 * | 11/2002 | Matsushima et al. | ........... | 345/98 |
| 2003/0080932 A1 * | 5/2003 | Konno et al. | ............. | 345/96 |
| 2004/0169808 A1 | 9/2004 | Shih et al. | | |
| 2005/0110924 A1 * | 5/2005 | Kim et al. | ............. | 349/111 |
| 2005/0168665 A1 * | 8/2005 | Ina et al. | ............. | 349/42 |
| 2006/0215071 A1 * | 9/2006 | Shin et al. | ............. | 349/44 |
| 2006/0250537 A1 * | 11/2006 | Lee | ............. | 349/43 |
| 2008/0297675 A1 * | 12/2008 | Kim | ............. | 349/38 |

FOREIGN PATENT DOCUMENTS

| CN | 1794067 A |   | 6/2006 |
|---|---|---|---|
| JP | 03209436 | * | 9/1991 |

* cited by examiner

*Primary Examiner* — Prabodh M Dharia
(74) *Attorney, Agent, or Firm* — Cantor Colburn LLP

(57) ABSTRACT

A display substrate includes a base substrate, a gate line, a data line, a pixel electrode and a shielding electrode. The base substrate includes a plurality of unit pixel areas arranged in a matrix shape. The gate line extends between the unit pixel areas. The data line crosses the gate line. The data line extends between the unit pixel areas. The pixel electrode is disposed in the unit pixel area. The pixel electrode is electrically connected to an output electrode of a switching element electrically connected to the gate and data lines. The shielding electrode is disposed the gate and data lines. The shielding electrode has an opening an opening formed therein, the opening disposed above and extending along a direction of the gate line.

23 Claims, 9 Drawing Sheets

DISPLAY SUBSTRATE AND DISPLAY PANEL HAVING THE SAME

This application claims priority to Korean Patent Application No. 2006-60450, filed on Jun. 30, 2006, and all the benefits accruing therefrom under 35 U.S.C. §119, the contents of which in its entirety are herein incorporated by reference.

BACKGROUND OF THE INVENTION

1. Field of the Invention

The present invention relates to a display substrate and a display panel having the display substrate. More particularly, the present invention relates to a display substrate capable of decreasing gate signal delay, and a display panel having the display substrate.

2. Description of the Related Art

Generally, a liquid crystal display "LCD" panel includes an array substrate having a plurality of thin-film transistors "TFTs" and a plurality of pixel electrodes, a color filter substrate having a plurality of color filters and a common electrode, and a liquid crystal layer interposed between the array substrate and the color filter substrate. The array substrate further includes a plurality of gate lines and a plurality of data lines. The gate lines and the data lines are crossed with respect to each other to define a plurality of unit pixels. Each of the TFTs and the pixel electrodes are generally formed in the unit pixels.

The display quality of an image displayed on an LCD panel primarily depends on normal communication of signals applied to the gate lines and the data lines.

Particularly, as a display device becomes larger in size, the gate lines become longer such that the time constant associated with the gate lines is increased. Furthermore, as the resolution of an image increases, the required turn-on time of a TFT is relatively decreased. Therefore, when the time constant of the gate line is not sufficiently small, the gate signal delay is increased and thus the output of a gate integrated circuit "IC" is insufficient. As an LCD panel becomes larger in size and higher resolution images are required, gate signal delay may be further increased when the driving frequency thereof is increased from 60 Hz to 120 Hz for displaying an image.

When the resistance of the gate line is higher, the gate signal delay may be increased. Furthermore, when a parasitic capacitance of the gate line is higher, the gate signal delay may be increased. Therefore, in order to decrease the gate signal delay, research has focused on the usage of a low-resistance metal as the gate line material, resulting in a design that suppresses generation of the parasitic capacitance.

Recently, in order to enhance the side viewing angle of an LCD panel, a patterned vertical alignment "PVA" mode and a super PVA "SPVA" mode have been developed. In the PVA mode LCD panel, a pixel electrode is patterned so that a unit pixel area is divided into a plurality of domains. In the SPVA mode LCD panel, the patterned pixel electrodes are divided into a plurality of sub-pixel electrodes that are electrically isolated from each other. Particularly, when the sub-pixel electrodes formed in one unit pixel area are electrically connected to different gate lines, respectively, gate signal delay becomes an obstacle when an image is displayed on the SPVA mode LCD panel.

BRIEF SUMMARY OF THE INVENTION

Aspects of the present invention provide a display substrate capable of decreasing parasitic capacitance of a capacitor formed by a gate line to decrease signal delay.

Further aspects of the present invention also provide a display panel having the above-mentioned display substrate.

In one exemplary embodiment of the present invention, a display substrate includes a base substrate, a gate line, a data line, a pixel electrode and a shielding electrode. The base substrate includes a plurality of unit pixel areas arranged in a matrix shape. The gate line extends between the unit pixel areas. The data line crosses the gate line. The data line extends between the unit pixel areas. The pixel electrode is disposed in the unit pixel area. The pixel electrode is electrically connected to an output electrode of a switching element that is electrically connected to the gate line and the data line. The shielding electrode is disposed over the gate line and the data line. The shielding electrode has an opening formed therein, the opening disposed above and extending along a direction of the gate line.

In one aspect, the shielding electrode and the pixel electrode are formed from the same layer and the same material. An inner edge portion of the shielding electrode defined by the opening is overlapped by the gate line. The shielding electrode has a wider width than that of the gate line so as to cover the gate line. The shielding electrode is spaced apart from the pixel electrode by a predetermined distance. A width of the gate line is decreased at a crossing portion that crosses the data line. A width of the data line is decreased at a crossing portion that crosses the gate line. An entire width of the opening is disposed directly above a width of the gate line. A domain division pattern is formed in the pixel electrode.

In another exemplary embodiment of the present invention, a display panel includes a first substrate, a second substrate and a liquid crystal layer that is interposed between the first and second substrates. The first substrate includes a gate line, a data line, a pixel electrode, a switching element and a shielding electrode. The gate line is arranged on a lower substrate. The data line crosses with the gate line. The pixel electrode is disposed in a unit pixel area that is defined by gate and data lines adjacent to each other. The switching element is electrically connected to the gate line, the data line and the pixel electrode. The shielding electrode is disposed over the gate line and the data line. The shielding electrode has a first opening formed therein, the opening disposed above and extending along a direction of the gate line. The second substrate includes an upper substrate that faces the lower substrate, and a common electrode formed on the upper substrate, the common electrode facing the pixel electrode.

In one aspect, the first substrate further includes a protective insulation layer that covers the gate line, the data line and the switching element. The pixel electrode and the shielding electrode are formed on the protective insulation layer. An inner edge portion of the shielding electrode that is formed by the first opening is overlapped by the gate line, and an outer edge portion of the shielding electrode is interposed between an edge portion of the pixel electrode and an edge portion of the gate line. The common electrode has second opening formed therein, the second opening faces the first opening of the shielding electrode. An inner edge portion of the common electrode defined by the second opening is interposed between the inner and outer edge portions of the shielding electrode. The second substrate further includes a light-blocking pattern, a color filter and an overcoating layer. The light-blocking pattern is formed on the upper substrate corresponding to the gate line, the data line and the switching element. The color filter corresponds to the unit pixel area. The overcoating layer covers the light-blocking pattern and the color filter. The overcoating layer has a flat surface having the common electrode formed thereon. A first domain division pattern is formed on the pixel electrode, and a second domain division pattern is formed on the common electrode. The second domain division pattern and the first domain division pattern cross each other.

In another aspect, an entire width of the first opening is disposed directly above a width of the gate line, and the entire width of the gate line is disposed directly below a width of the second opening.

According to the display substrate and the display panel having the display substrate, gate signal delay may be decreased in the display panel having a large size and a high resolution, so that a display image having good quality may be achieved.

BRIEF DESCRIPTION OF THE DRAWINGS

The above and other aspects, features and advantages of the present invention will become readily apparent by reference to the following detailed description when considered in conjunction with the accompanying drawings wherein.

DETAILED DESCRIPTION OF THE INVENTION

Figure 1:
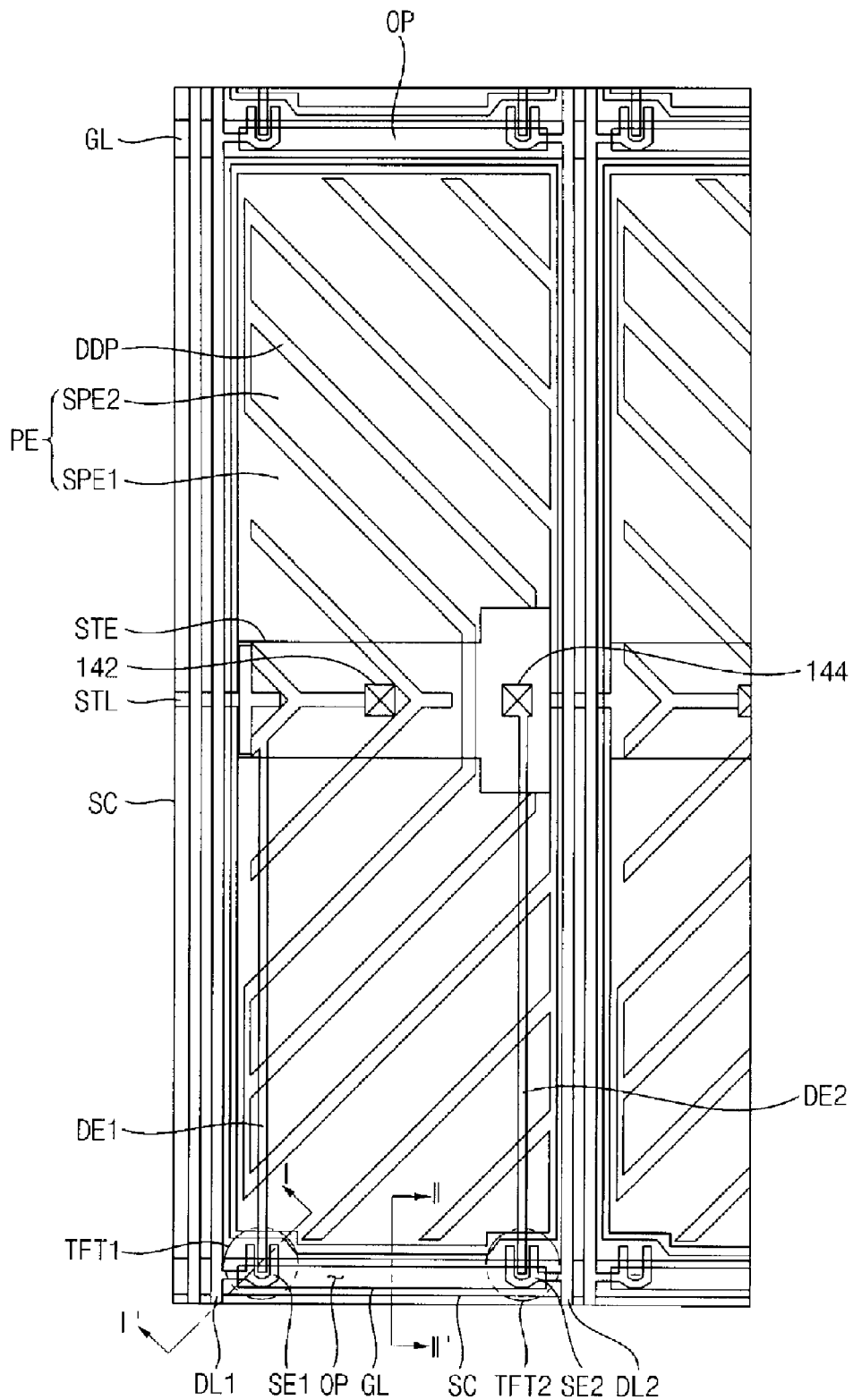
FIG. 1 is a plan view illustrating a display substrate according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the present invention are described herein with reference to cross-section illustrations that are schematic illustrations of idealized embodiments (and intermediate structures) of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Display Substrate

Figure 2:
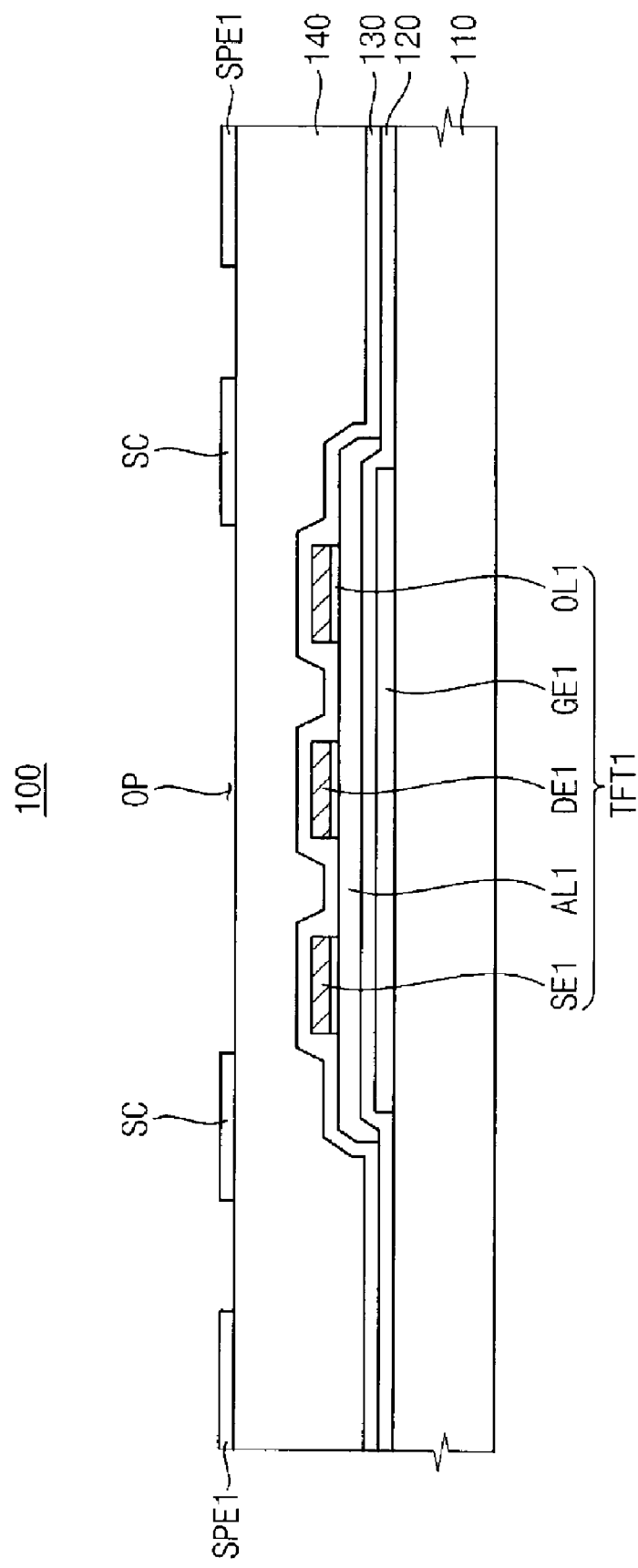
FIG. 2 is a cross-sectional view taken along the line I-I' of FIG. 1.

FIG. 1 is a plan view illustrating a display substrate according to an exemplary embodiment of the present invention. FIG. 2 is a cross-sectional view taken along the line I-I' of FIG. 1.

Referring to FIGS. 1 and 2, a display substrate 100 includes a base substrate 110, a gate line GL, a pair of data lines DL1 and DL2, a pixel electrode PE and a shielding electrode SC.

The base substrate 110 may include a glass having optical isotropy. A plurality of unit pixel areas having, for example, a matrix shape is arranged in the base substrate 110. In addition to a matrix shape, the unit pixel areas may also be arranged in other shapes, such a mosaic shape, for example, on the base substrate 110.

The gate line GL is extended between the unit pixel areas on the base substrate 110. The data lines DL1 and DL2 are insulated from the gate line GL, and arranged on the base substrate 110 having the gate line GL thereon. The data lines DL1 and DL2 are crossed with the gate line GL, and extend between the unit pixel areas. The gate line GL may include a material having a relatively small specific resistance, such as, for example, aluminum (Al), molybdenum (Mo), tantalum (Ta), titanium (Ti), tungsten (W), chromium (Cr), silver (Ag), copper (Cu), and an alloy(s) thereof.

To decrease the delay of a control signal that is applied into the gate line GL, the gate line GL may include a metal having a relatively low resistance, while a cross-section of the gate line GL may have a relatively large size. However, the line width of the gate line GL and the aperture ratio of the unit pixel area are inversely proportion to each other. Also, when the thickness of the gate line GL is too thick, the formation of another layer that is formed on an upper portion of the gate line GL may be difficult. In the present exemplary embodiment, the gate line GL has a first width associated therewith. Alternatively, to decrease an overlapping size between the gate line GL and the data line DL, a width of the gate line GL may be decreased at a crossing portion that crosses the data line DL, and a width of the gate line GL may be decreased at a crossing portion that crosses the data line DL.

A plurality of TFTs is formed in each of the unit pixel areas. The TFT is electrically connected to the gate line GL, and the data lines DL1 and DL2. Each of the TFTs is arranged along each of the gate lines GL or each of the data lines DL1 and DL2. Each of the TFTs is electrically connected to the gate line GL and the data lines DL1 and DL2, and outputs a pixel voltage that is transferred from the data lines DL1 and DL2 in response to a control signal transferred from the gate line GL.

In the present exemplary embodiment, one gate line GL and two data lines DL1 and DL2 correspond to one unit pixel area. Each of the data lines DL1 and DL2 corresponding to a unit pixel area is defined as a first data line DL1 and a second data line DL2, respectively, for the unit pixel area. A TFT corresponding to the first data line DL1 is defined as a first TFT or "TFT1," and a TFT corresponding to the second data line DL2 is defined as a second TFT or "TFT2." As the structure of the TFT1 is substantially the same as the structure of TFT2, only TFT1 shown in FIGS. 1 and 2 will be described in detail, for purposes of simplicity.

TFT1 includes, as shown in FIGS. 1 and 2, a first gate electrode GE1, a gate insulation layer 120, a first active layer AL1, a first ohmic contact layer OL1, a first source electrode SE1 and a first drain electrode DE1.

The first gate electrode GE1 is formed to extend from the gate line GL along a first direction. The gate insulation layer 120 is formed on the base substrate 110 having the gate line GL formed thereon. For example, the first active layer AL1 may include a semiconductor, such as amorphous silicon. The first active layer AL1 is formed on the gate insulation layer 120 at a location corresponding to the first gate electrode GE1.

The source electrode SE1 overlaps the first active layer AL1 of the first data line DL1. In an exemplary embodiment, the source electrode SE1 may have a U-shape, as particularly seen in FIG. 1. The first drain electrode DE1 and the first source electrode SE1 are formed from the same layer. The first drain electrode DE1 is spaced apart from the first source electrode SE1 by a predetermined distance. For example, the first drain electrode DE1 may be arranged at a central portion of the U-shaped first source electrode SE1, between opposing sides thereof. The first drain electrode DE1 partially overlaps the first active layer AL1, and extends in a generally parallel direction with respect to the first data line DL1. The first ohmic contact layer OL1 may include, for example, n+ amorphous silicon (n+ a-Si). In an exemplary embodiment, N-type dopants are doped into the n+ amorphous silicon of the first ohmic contact layer OL1 at a high concentration. The first ohmic contact layer OL1 is formed between the first active layer AL1 and the first source electrode SE1 and between the first active layer AL1 and the first drain electrode DE1, respectively.

The display substrate 100 further includes a passivation layer 130 and a protecting insulation layer 140.

The passivation layer 130 may cover TFT1, TFT2, the first data line DL1, the second data line DL2 and the gate insulation layer 120.

The protecting insulation layer 140 is formed on the passivation layer 130 to planarize a surface of the display substrate 100. In the present exemplary embodiment, the protecting insulation layer 140 may be an organic insulation layer 140 that maintains a color of light directed into the base substrate 110. Alternatively, the protecting insulation layer 140 may include color filters having different colors with respect to one other, corresponding to unit pixel areas. In another alternative embodiment, either the passivation layer 130 or the protecting insulation layer 140 may be omitted.

The pixel electrode PE is formed in a unit pixel area of the organic insulation layer 140. The pixel electrode PE, for example, includes a transparent conductive material such as indium tin oxide "ITO," indium zinc oxide "IZO," amorphous ITO "a-ITO," etc.

In the present exemplary embodiment, the pixel electrode PE includes a first sub-electrode SPE1 and a second sub-electrode SPE2 that are electrically separated from each other. A domain division pattern DDP is formed in the first and second sub-electrodes SPE1 and SPE2, respectively. In the present exemplary embodiment, the domain division pattern DDP has a V-shaped opening pattern in which a portion of the first sub-electrode SPE1 and a portion of the second sub-electrode SPE2 have been partially removed. Alternatively, the domain division pattern DDP may have a protrusion pattern.

The first sub-electrode SPE1 is electrically connected to the first drain electrode DE1 of TFT1 through a first contact hole 142 formed on the organic insulation layer 140, and the second sub-electrode SPE2 is electrically connected to a second drain electrode DE2 of TFT2 through a second contact hole 144.

The display substrate 100 further includes a storage line STL. The storage line STL may be formed from the same layer as the gate line GL, and may be arranged across the unit pixel area in parallel with the gate line GL. A width of the storage line STL corresponding to the unit pixel area is increased, thereby forming a storage electrode STE.

Figure 3:
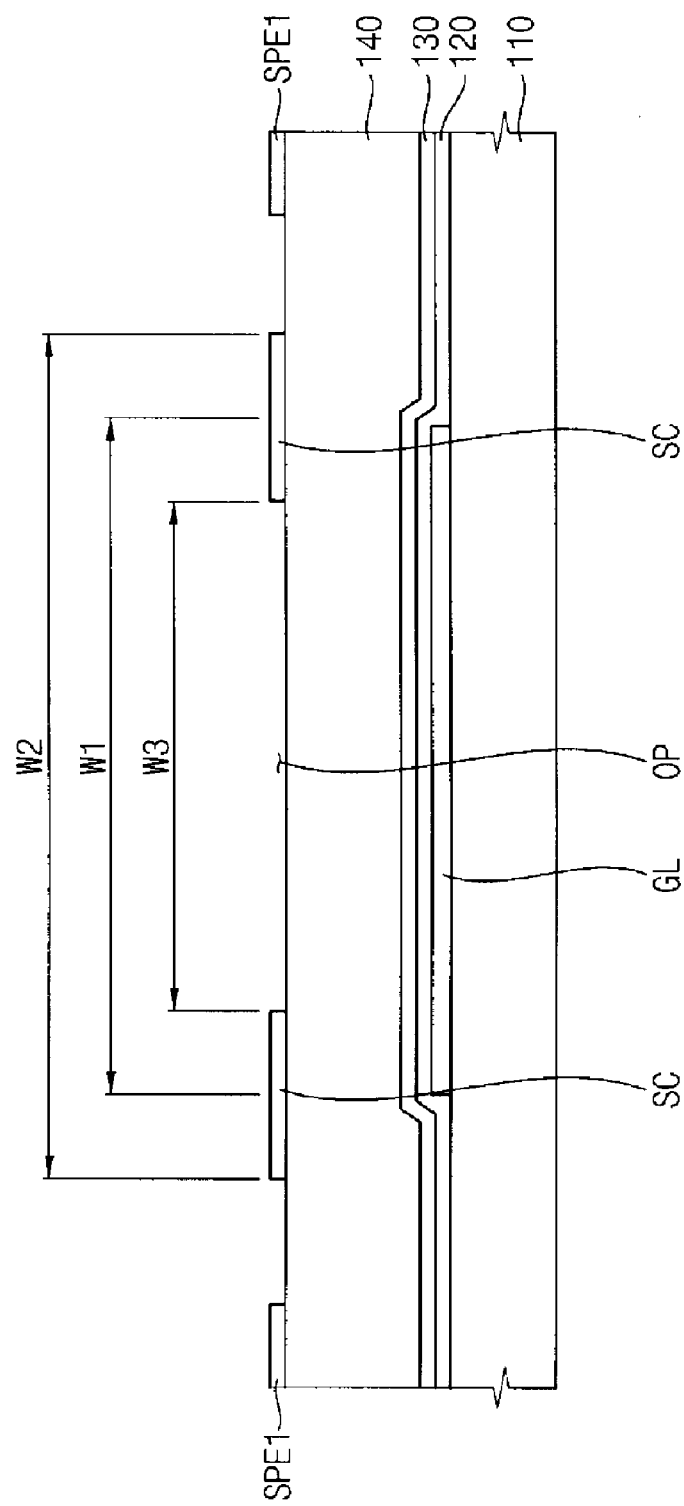
FIG. 3 is a cross-sectional view taken along the line II-II' of FIG. 1.

FIG. 3 is a cross-sectional view taken along the line II-II' of FIG. 1.

Referring to FIGS. 1 to 3, the shielding electrode SC is formed from the same material as the pixel electrode PE on the organic insulation layer 140. The shielding electrode SC is formed between adjacent unit pixel areas. Thus, the shielding electrode SC is formed over the gate line GL and the first and second data lines DL1 and DL2. The shielding electrode SC corresponding to the gate line GL has a second width W2 that is greater than the first width W1 of the gate line GL so as to completely cover the gate line GL. An exterior edge portion of the shielding electrode SC is interposed between an edge portion of the pixel electrode PE and an edge portion of the gate line GL.

In the present exemplary embodiment, the gate line GL and the pixel electrode PE are not shown as overlapping with each other when viewed in a plan view of the display substrate; however, they are closely formed proximate each other at a distance on the order of about one to tens of micrometers. Also, the data lines DL1 and DL2 and the pixel electrode PE are not shown as overlapping with each other when viewed in a plan view of the display substrate; however, they are closely formed proximate each other at a distance of about one to tens of micrometers. Thus configured, the gate insulation layer 120, the passivation layer 130 and the organic insulation layer 140 define a dielectric substance, so that a first parasitic capacitor may be defined between the gate line GL and the pixel electrode PE, and a second parasitic capacitor may be defined between the data lines DL1 and DL2 and the pixel electrode PE.

As the shielding electrode SC is also formed above the gate line GL and the data lines DL1 and DL2, a third parasitic capacitor may be formed between the shielding electrode SC and the gate line GL, and between the shielding electrode SC and the data lines DL1 and DL2. When the third parasitic capacitor is formed, the size of the first capacitor and the size of the second capacitor may be significantly decreased. Therefore, distortion of the pixel voltage applied in the pixel electrode PE, delay of the gate signal and distortion of the data signal may be reduced by decreasing the first and second parasitic capacitors.

The parasitic capacitor formed by the gate line GL may be small in order to decrease delay of the gate signal such that the third parasitic capacitor may also be small.

In the present exemplary embodiment, a portion of the shielding electrode SC formed above the gate line GL is removed, so that an opening OP is formed. The opening OP extends along the direction of the gate line GL, and has a third width W3 that is smaller than the first width W1 of the gate line GL. The opening OP is formed to fully overlap with the gate line GL. That is, an inner edge portion of the shielding electrode SC defined by the opening OP overlaps with the gate line GL. Stated another way, the third width W3 (entire width) of the opening OP is disposed directly above the first width W1 of the gate line GL. Accordingly, even though the opening OP is formed in the shielding electrode SC, the third capacitor is formed because a portion of the shielding electrode SC is overlapped with the gate line GL. Therefore, the ability to reduce the size of the first and second parasitic capacitors is still maintained.

When the overlap between the shielding electrode SC and the gate line GL is increased, the capacitance of the third capacitor may be increased. In addition, by decreasing the separation distance between the shielding electrode SC and the gate line GL, the capacitance of the third capacitor may be increased. When the dielectric constant of the gate insulation layer 120, the passivation layer 130 and the organic insulation layer 140 is increased, the capacitance of the third capacitor may also be increased.

In the present exemplary embodiment, the capacitance of the third parasitic capacitor may be significantly decreased due to the opening OP formed in the shielding electrode SC. Also, even where the line width of the gate line GL is increased, an increase in the capacitance of the third parasitic capacitor may be prevented due to the opening OP formed in the shielding electrode SC. Therefore, by increasing the line width of the gate line GL, the resistance of the gate line GL may be decreased. Additionally, the capacitance of the third parasitic capacitor may be decreased due to the opening OP formed in the shielding electrode SC, so that the gate signal delay may be decreased.

Display Panel

Figure 4:
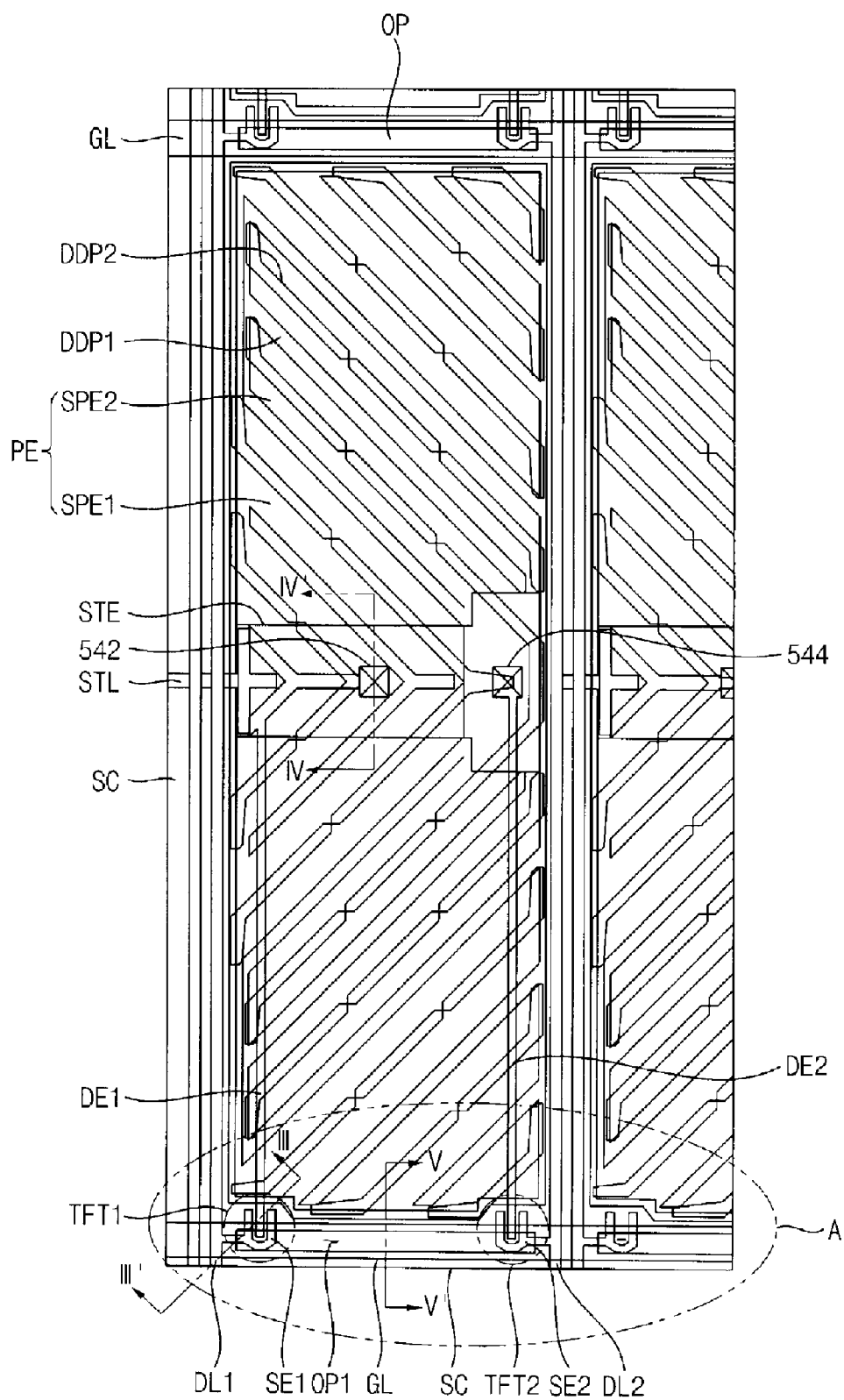
FIG. 4 is a plan view illustrating a display panel according to an exemplary embodiment of the present invention.

FIG. 4 is a plan view illustrating a display panel according to another exemplary embodiment of the present invention.

Referring generally to FIGS. 4 to 7, a display panel 500 includes a first substrate 501, a second substrate 601 and a liquid crystal layer LC interposed between the first and second substrates 501 and 601. The first substrate 501 is substantially the same as the display substrate 100 as shown in FIGS. 1 to 3.

Therefore, when viewed based on a unit pixel area, the first substrate 501 includes a lower substrate 510, a gate line GL, a first data line DL1, a second data line DL2, a gate line GL, a pixel electrode PE, a first TFT TFT1, a second TFT TFT2 and a shielding electrode SC. The gate line GL is disposed on the lower substrate 510. The first and second data lines DL1 and DL2 are crossed with the gate line GL. The pixel electrode PE is disposed in the unit pixel area defined by the gate line GL, the first data line DL1 and the second data line DL2. Each of the first and second TFTs TFT1 and TFT2 switch a first data signal corresponding to the first data line DL1 and a second data signal corresponding to the second data line DL2 to the pixel electrode PE, respectively. The shielding electrode SC is formed between the unit pixel areas.

The shielding electrode SC is formed over the gate line GL, the first data line DL1 and the second data line DL2. A first opening OP1 is formed in the shielding electrode SC, corresponding to the gate line GL.

The lower substrate 510, a first domain division pattern DDP1 formed on the pixel electrode PE, and the first opening OP1 formed in the shielding electrode SC correspond to the base substrate 110, the domain division pattern DDP and the opening OP as shown in FIGS. 1 to 3.

Figure 5:
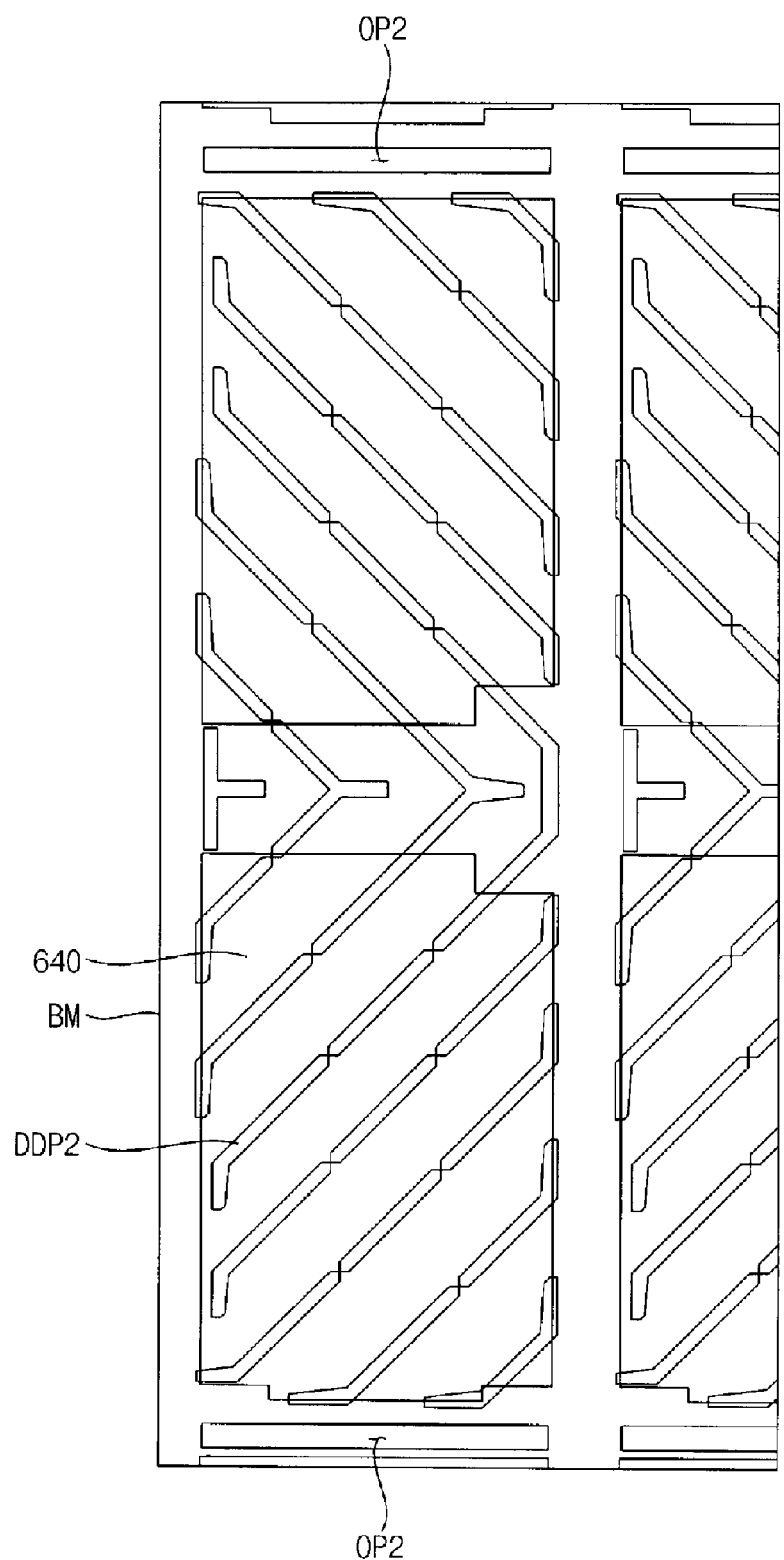
FIG. 5 is a plan view illustrating a second substrate of the display panel of FIG. 4.
Figure 6:
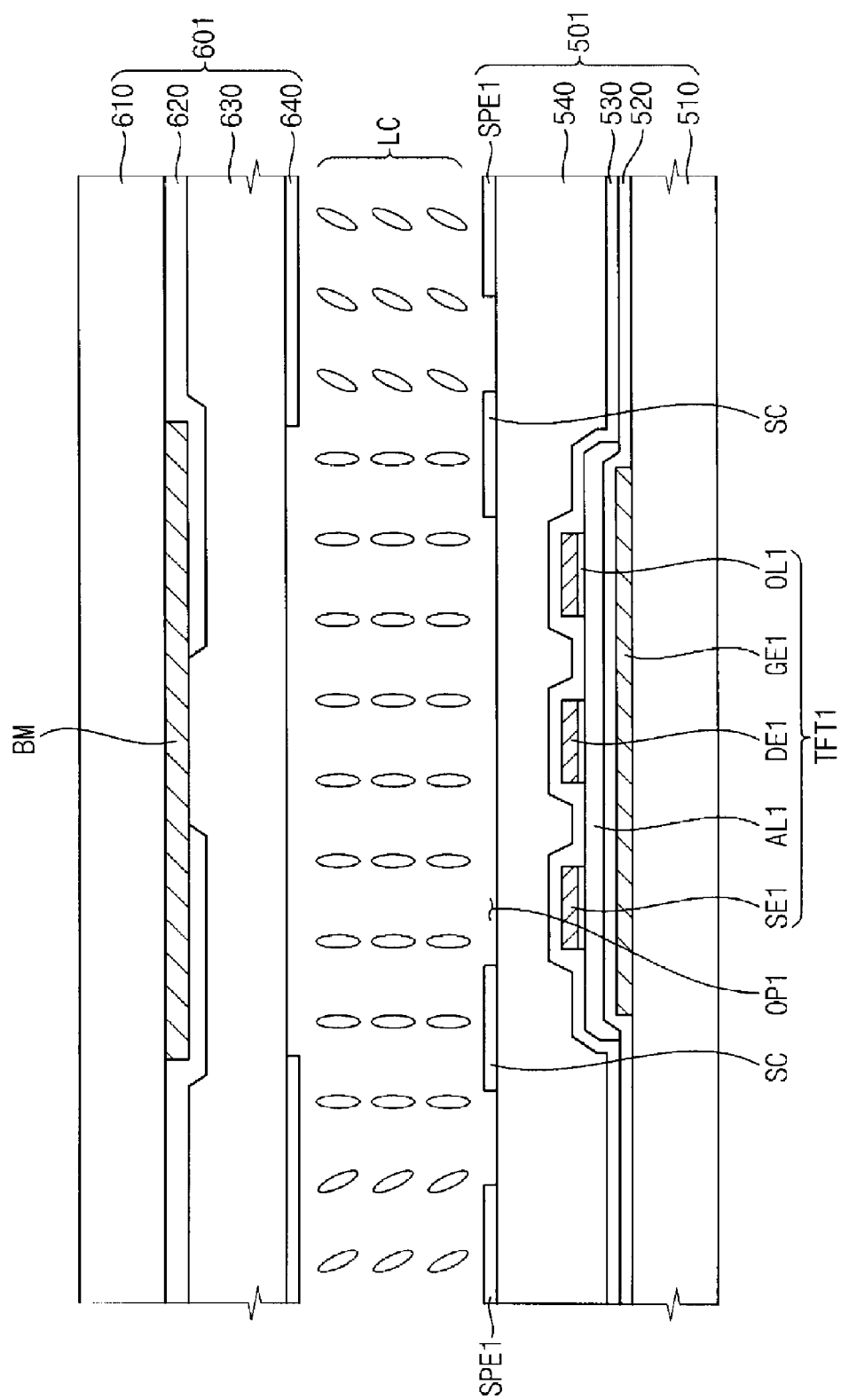
FIG. 6 is a cross-sectional view taken along the line III-III' of FIG. 4.
Figure 7:
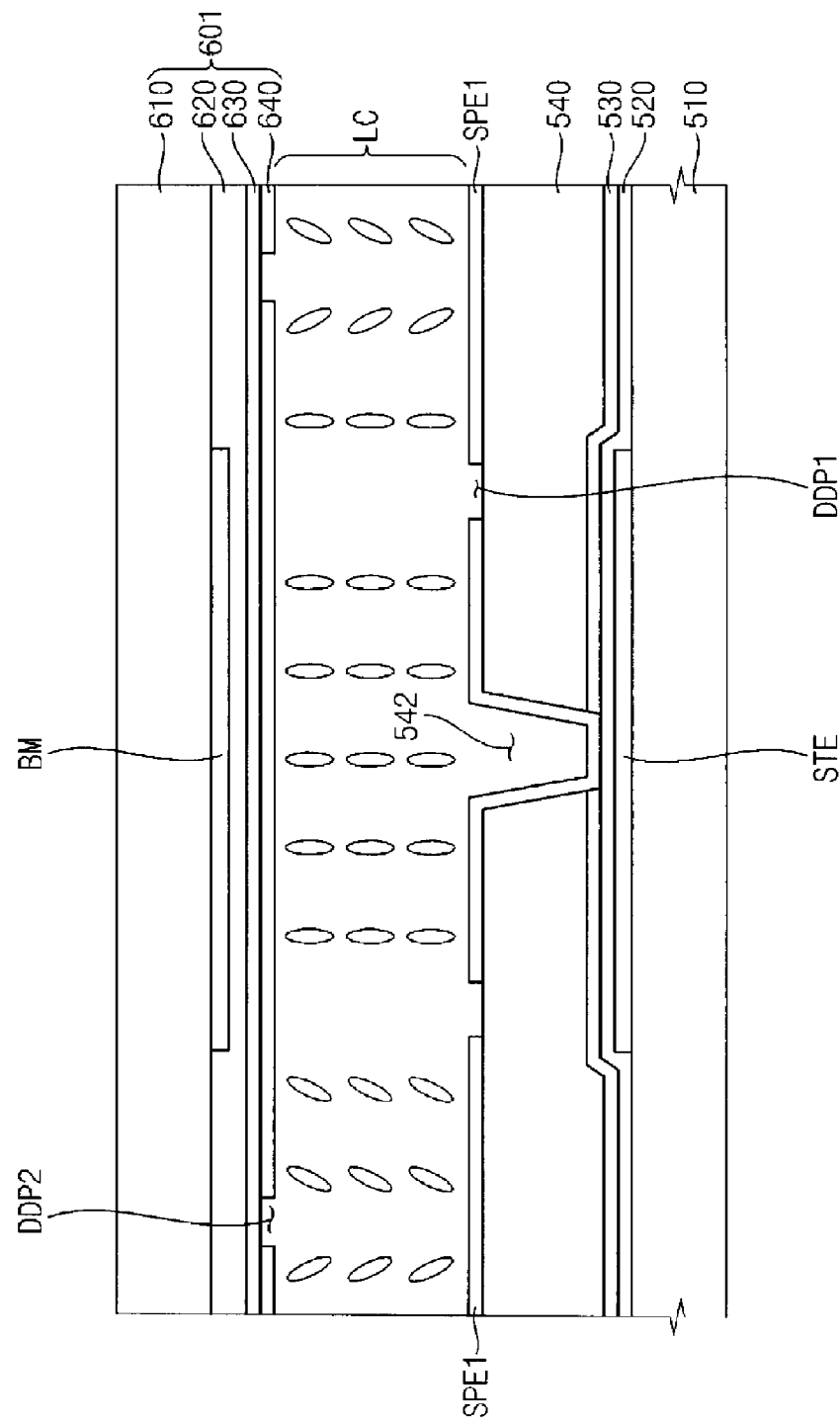
FIG. 7 is a cross-sectional view taken along the line IV-IV' of FIG. 4.

FIG. 5 is a plan view illustrating a second substrate of the display panel of FIG. 4. FIG. 6 is a cross-sectional view taken along the line III-III' of FIG. 4. FIG. 7 is a cross-sectional view taken along the line IV-IV' of FIG. 4.

Referring to FIGS. 5 to 7, the second substrate 601 includes an upper substrate 610 that faces a lower substrate 510 of the first substrate 501, a light-blocking pattern BM, a color filter 620, an overcoating layer 630 and a common electrode 640.

The light-blocking pattern BM is formed on a first surface of the upper substrate 610 facing the lower substrate 510. The light-blocking pattern BM covers an intermediate area between adjacent unit pixel areas, TFT1, TFT2, the gate line GL, the first data line DL1, the second data line DL2 and a storage line STL (FIG. 4). The light-blocking pattern BM defines an opening portion having a shape corresponding to the unit pixel area. For example, the light-blocking pattern BM may include an organic material. Alternatively, the light-blocking pattern BM may include an inorganic material such as chromium (Cr).

The color filter 620 is formed in the opening portion, and is overlapped with a portion of the light-blocking pattern BM. The color filter 620 may be one of a red color filter, a green color filter and a blue color filter. The red color filter, the green color filter and the blue color filter may be arranged in any of a number of shapes such as, for example, a stripe shape, a mosaic shape, etc.

Alternatively, when a color filter 620 is formed on the first substrate 501 replacing the organic insulation layer 540 formed on the passivation layer 530, the color filter may be omitted from the second substrate 601.

The overcoating layer 630 covers the color filter 620 and the light-blocking pattern BM to protect the color filter 620 and the light-blocking pattern BM, and planarizes a surface of the second substrate 601. The overcoating layer 630 may include a transparent organic material.

The common electrode 640 may be formed from the same material as the pixel electrode PE formed on the overcoating layer 630. A second domain division pattern DDP2, for example, includes an opening pattern formed on the common electrode 640 corresponding to the unit pixel area. The first domain division pattern DDP1 and the second domain division pattern DDP2 may cross each other. Therefore, the unit pixel area may be divided into a plurality of domains. In the embodiment illustrated, a domain is defined as regions where groups of liquid crystal molecules having the same alignment direction exist.

When the gate line GL and the common electrode 640 are overlapped with each other, a fourth parasitic capacitor may be formed in the gate line GL. The fourth parasitic capacitor may increase gate signal delay. In the present exemplary embodiment, a portion of the common electrode 640 corresponding to the gate line GL may be removed in order to decrease an overlap size between the gate line GL and the common electrode 640, so that a second opening OP2 may be formed. As described more fully below with reference to FIG. 9, the second opening OP2 may correspond to the first opening OP1 formed in the shielding electrode SC.

The liquid crystal layer LC is interposed between the first substrate 501 and the second substrate 601 as shown in FIG. 6. Liquid crystal molecules associated with adjacent domains are arranged in a different direction with respect to one another. Therefore, the viewing angle corresponding to one unit pixel area may be increased.

Figure 8:
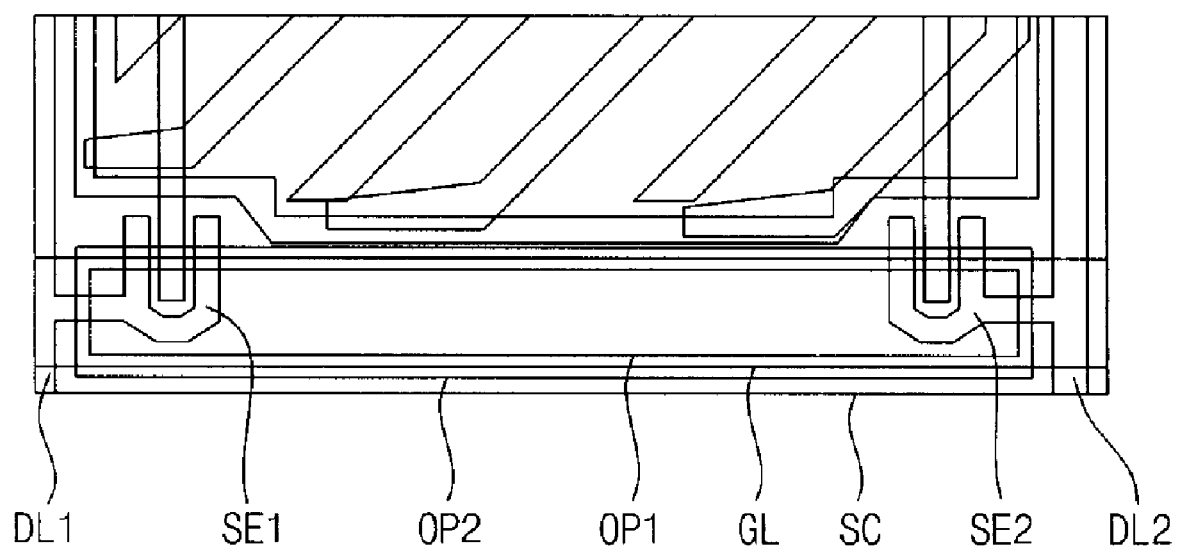
FIG. 8 is an enlarged view illustrating a portion of the first area A of FIG. 4.
Figure 9:
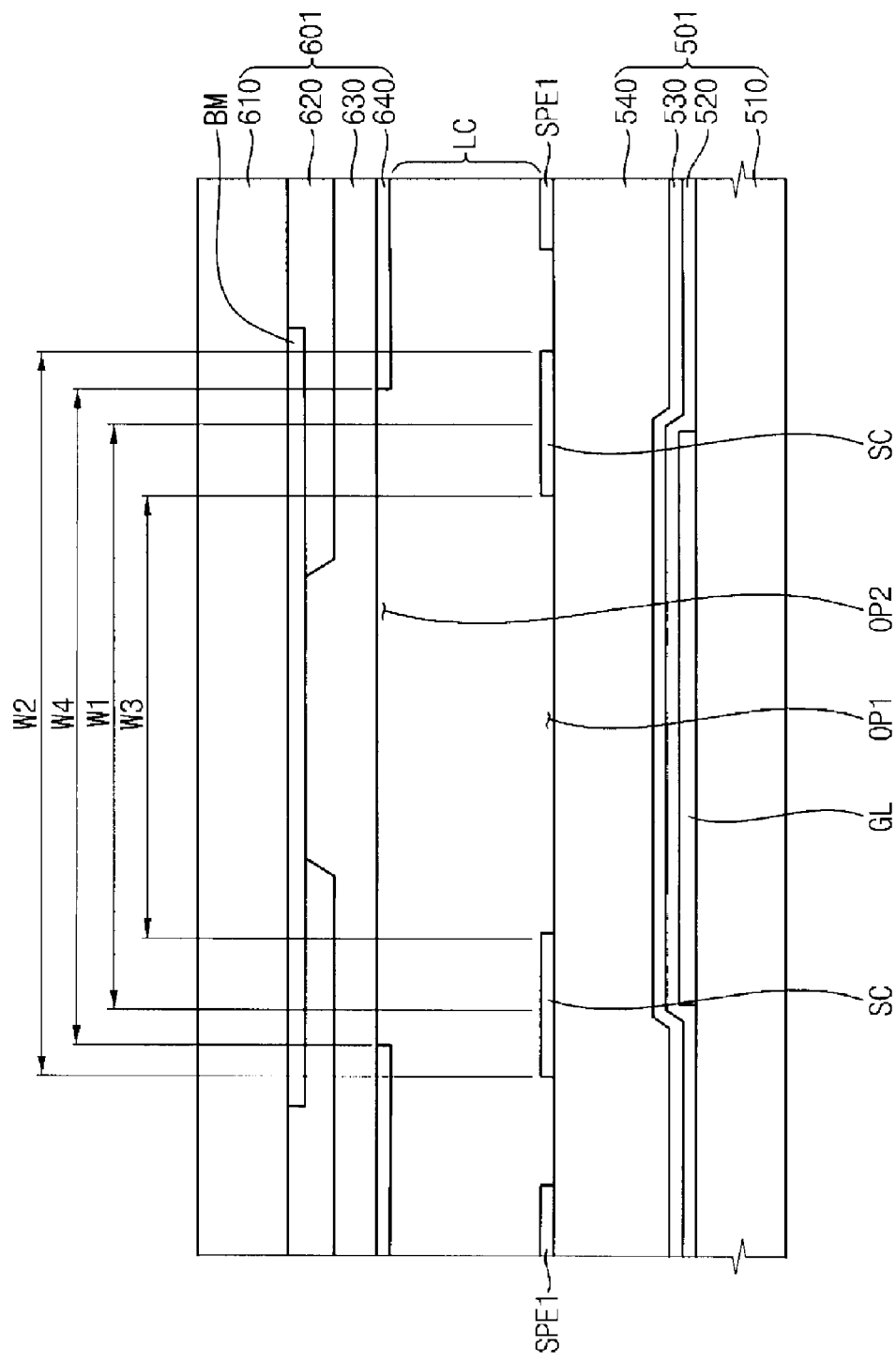
FIG. 9 is a cross-sectional view taken along the line V-V' of FIG. 4.

FIG. 8 is an enlarged view illustrating a portion of the first area A of FIG. 4. FIG. 9 is a cross-sectional view taken along the line V-V' of FIG. 4.

Referring to FIGS. 8 and 9, the gate line GL has a first width W1. The shielding electrode SC disposed over the gate line GL has a second width W2 that is greater than the first width W1, and is spaced apart from the pixel electrode PE by a predetermined distance. Therefore, an external edge portion of the shielding electrode SC is interposed between an edge portion of the pixel electrode PE and an edge portion of the gate line GL.

A first opening OP1 is formed in the shielding electrode SC corresponding to the location of the gate line GL therebeneath, and extends along the direction of the gate line GL. The first opening OP1 has a third width W3 that is smaller than the first width W1. The first opening OP1 is fully overlapped by the gate line GL. Therefore, an inner edge portion of the shielding electrode SC formed by the first opening OP1 overlaps with the gate line GL.

A capacitance of the third parasitic capacitor may be significantly decreased due to the first opening OP1, which is formed in the shielding electrode SC. However, as the third parasitic capacitor is formed, the formation of the first parasitic capacitor between the pixel electrode PE and the gate line GL is suppressed so that a distortion of the pixel voltage applied to the pixel electrode PE and gate signal delay may be decreased.

As described above, the second opening OP2 is formed on the common electrode 640 at a location corresponding to the gate line GL, in a manner so as to reduce the capacitance of the fourth parasitic capacitor, defined between the gate line GL and the common electrode 540. The common electrode 640 and the gate line GL may be overlapped with each other in order to suppress the formation of the fourth parasitic capacitor.

In the present exemplary embodiment, the second opening OP2 may extend along the direction of the gate line GL, which has a fourth width W4 that is greater than the first width W1 of the gate line GL. The second opening OP2 may be longer than the first opening OP1. Stated another way, the third width W3 (entire width) of the first opening OP1 is disposed directly above the first width W1 of the gate line GL, and the entire width of the gate line GL is disposed directly below the fourth width W4 of the second opening OP2. Therefore, the first opening OP1 is completely disposed within the second opening OP2 when viewed in a plan view, and the inner edge portion of the common electrode 640 formed by the second opening OP2 may be interposed between an edge portion of the gate line GL and an external edge portion of the shielding electrode SC.

Even though the line width of the gate line GL may be increased, an increase in the capacitance of the third parasitic capacitor may be prevented due to the first opening OP1 formed in the shielding electrode SC, while the formation of the fourth parasitic capacitor may be suppressed due to the second opening OP2 formed in the common electrode 640.

According to the present invention embodiments described herein, in order to suppress signal interference between the pixel electrode and the gate line, and between the pixel electrode and data line, a shielding electrode, spaced apart from the pixel electrode, is formed on the gate line and the data line of the display panel. Openings are respectively formed in the shielding electrode and common electrode at locations that correspond to the gate line, so that a capacitance of the parasitic capacitor formed on the gate line may be significantly decreased. As a result, the gate line width may be increased without increasing the capacitance of the parasitic capacitor, so that the gate signal delay may be significantly decreased.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:
1. A display substrate, comprising:
 a base substrate including a plurality of unit pixel areas arranged in a matrix shape;
 a gate line extending between the unit pixel areas;
 a data line that crosses the gate line, the data line extending between the unit pixel areas;
 a pixel electrode that is disposed in the unit pixel area, the pixel electrode being electrically connected to an output electrode of a switching element that is electrically connected to the gate line and the data line; and
 a shielding electrode that is disposed over and extending along the gate line and the data line, the shielding electrode having an opening formed therein, the opening disposed above and extending along a direction of the gate line, the shielding electrode having a width greater than that of the gate line so as to completely cover the gate line.

2. The display substrate of claim 1, wherein the shielding electrode and the pixel electrode are formed from a same layer.

3. The display substrate of claim 2, wherein the shielding electrode and the pixel electrode are formed from a same material.

4. The display substrate of claim 2, wherein an inner edge portion of the shielding electrode defined by the opening is overlapped by the gate line.

5. The display substrate of claim 4, wherein the shielding electrode is spaced apart from the pixel electrode by a predetermined distance.

6. The display substrate of claim 5, further comprises a protective insulation layer that covers the gate line, the data line and the switching element, and
the pixel electrode and the shielding electrode are formed on the protective insulation layer.

7. The display panel of claim 6, wherein the protective insulation layer includes a color filter.

8. The display substrate of claim 5, wherein a domain division pattern is formed in the pixel electrode.

9. The display substrate of claim 1, wherein a width of the gate line is decreased at a crossing portion that crosses the data line.

10. The display substrate of claim 1, wherein a width of the data line is decreased at a crossing portion that crosses the gate line.

11. The display substrate of claim 1, wherein an entire width of the opening is disposed directly above a width of the gate line.

12. A display panel comprising:
a first substrate including:
a gate line arranged on a lower substrate;
a data line that crosses with the gate line;
a pixel electrode disposed in a unit pixel area that is defined by gate and data lines adjacent to each other;
a switching element electrically connected to the gate line, the data line and the pixel electrode; and
a shielding electrode that is disposed over and extending along the gate line and the data line, the shielding electrode having a first opening formed therein, the opening disposed above and extending along a direction of the gate line, the shielding electrode having a width greater than that of the gate line so as to completely cover the gate line;
a second substrate including an upper substrate that faces the lower substrate, and a common electrode formed on the upper substrate, the common electrode facing the pixel electrode; and
a liquid crystal layer interposed between the first and second substrates.

13. The display panel of claim 12, wherein the first substrate further comprises a protective insulation layer that covers the gate line, the data line and the switching element, and
the pixel electrode and the shielding electrode are formed on the protective insulation layer.

14. The display panel of claim 13, wherein an inner edge portion of the shielding electrode that is defined by the first opening is overlapped by the gate line, and an outer edge portion of the shielding electrode is interposed between an edge portion of the pixel electrode and an edge portion of the gate line.

15. The display panel of claim 13, wherein the common electrode has a second opening formed therein, the second opening facing the first opening of the shielding electrode.

16. The display panel of claim 15, wherein an inner edge portion of the common electrode defined by the second opening is interposed between the inner and outer edge portions of the shielding electrode.

17. The display panel of claim 16, wherein the second substrate further comprises:
a light-blocking pattern that is formed on the upper substrate corresponding to the gate line, the data line and the switching element;
a color filter that corresponds to the unit pixel area; and
an overcoating layer that covers the light-blocking pattern and the color filter, the overcoating layer having a flat surface having the common electrode formed thereon.

18. The display panel of claim 16, wherein the protective insulation layer includes a color filter.

19. The display panel of claim 16, wherein a first domain division pattern is formed on the pixel electrode, and
a second domain division pattern is formed on the common electrode, wherein the second domain division pattern and the first domain division pattern cross each other.

20. The display panel of claim 15, wherein an entire width of the first opening is disposed directly above a width of the gate line.

21. The display panel of claim 20, wherein the entire width of the gate line is disposed directly below a width of the second opening.

22. The display panel of claim 12, wherein the shielding electrode is formed between adjacent unit pixel areas.

23. The display panel of claim 12, wherein an exterior edge portion of the shielding electrode is disposed between an edge portion of the pixel electrode and an edge portion of the gate line.

* * * * *